United States Patent [19]

Furukawa

[11] Patent Number: 5,049,257

[45] Date of Patent: Sep. 17, 1991

[54] FLUID FOR ELECTRICAL DISCHARGE MACHINING

[75] Inventor: Toshihiko Furukawa, Kanagawa, Japan

[73] Assignee: Sodick Co., Ltd., Kanagawa, Japan

[21] Appl. No.: 274,602

[22] Filed: Nov. 18, 1988

Related U.S. Application Data

[63] Continuation of Ser. No. 75,222, Jul. 17, 1987, abandoned, which is a continuation of Ser. No. 776,596, Sep. 16, 1985, abandoned.

[51] Int. Cl.$^5$ ............................................. C10G 00/00
[52] U.S. Cl. ........................................ 208/14; 585/1; 585/6; 585/13; 585/6.3; 585/6.6; 252/570
[58] Field of Search ................... 208/14; 585/1, 6, 13, 585/6.3, 6.6; 252/570

[56] References Cited

U.S. PATENT DOCUMENTS

| | | | |
|---|---|---|---|
| 2,058,899 | 10/1936 | Matheson | 208/14 |
| 2,075,410 | 3/1937 | Thompson | 208/14 |
| 2,996,455 | 8/1961 | Brown et al. | 208/18 |
| 3,252,887 | 5/1966 | Rizzuti | 208/14 |
| 3,436,349 | 4/1969 | Olund | 585/13 |
| 3,625,878 | 12/1969 | Mills et al. | 208/14 |
| 3,715,302 | 2/1973 | Gomlaoven | 208/14 |
| 3,759,817 | 9/1973 | Mills et al. | 208/14 |
| 3,791,959 | 2/1974 | Mills et al. | 208/14 |
| 3,925,220 | 12/1975 | Mills | 208/14 |
| 3,928,168 | 12/1975 | Mills et al. | 208/14 |
| 4,033,854 | 7/1977 | Ohmori et al. | 208/14 |
| 4,069,166 | 1/1978 | Masanaga et al. | 585/6.6 |
| 4,172,026 | 10/1974 | Jensen | 208/14 |
| 4,324,933 | 4/1982 | Kimura et al. | 585/6.6 |
| 4,584,129 | 4/1986 | Kutayama | 208/14 |

*Primary Examiner*—Helane Myers
*Attorney, Agent, or Firm*—James Creighton Wray

[57] ABSTRACT

In a fluid for electrical discharge machining, a low viscosity mineral or synthetic oil is used as the base oil, to which is added ultrahigh-viscosity oil, the low viscosity oil raising the efficiency of chip removal from the workpiece-to-electrode gap adequately cooling said gap, while the addition of ultrahigh viscosity oil enables the voltage across the discharge electrodes to be increased, allowing an even larger amount of electrical discharge energy to be applied to the workpiece-to-electrode gap, providing a fluid for electrical discharge machining which enables discharge efficiency to be greatly raised and discharge machining speed to be increased.

9 Claims, 2 Drawing Sheets

FLUID FOR ELECTRICAL DISCHARGE MACHINING

This application is a continuation of Ser. No. 07/075,222 filed 7/17/87 now abandoned, which is a continuation of Ser. No. 06/776,596, filed 9/16/85 now abandoned.

BACKGROUND OF THE INVENTION

This invention relates to a fluid for electrical discharge machining. In order to improve electrical discharge machining performance, there has conventionally been used electrical discharge machining fluid consisting of an emulsion of water mixed with electrical discharge machining oil in the presence of a surfactant. With such an electrical discharge machine fluid, water in the form of globules distributed in the electrical discharge machining oil, in the space between the workpiece and electrode was condensed explosively by the discharge, producing energy that was utilized to improve the electrical discharge machining performance.

However, with such electrical discharge machining fluids in which a surfactant is mixed in to emulsify the water, a drawback with this method is that tar adhering around the machined portion separates from said machined portion and becomes distributed in the machining fluid as globules 0.5–1.0µ in diameter, so the fluid darkens with the progress of the machining process, so that it becomes difficult to observe the portion being machined, and working efficiency thereby is decreased. It is extremely difficult to remove this tar from the fluid by filtering or the like, and consequently a solution to this problem has been sought.

SUMMARY OF THE INVENTION

It is an object of this invention to provide an improved fluid for electrical discharge machining.

Another object of this invention is to provide a fluid for electrical discharge machining having the same or superior performance to the conventional electrical discharge machining fluids formed by dispersing water in the electrical discharge machining oil in the presence of a surfactant.

A further object is to provide a fluid for electrical discharge machining which does not produce darkening of the machining fluid.

In accordance with this invention, a low viscosity mineral or synthetic oil is used as the base oil, to which is added ultrahigh-viscosity oil, the low viscosity oil raising the efficiency of chip removal from the workpiece-to-electrode space adequately cooling said space, while the addition of ultrahigh viscosity oil enables the voltage across the discharge electrodes to be increased, allowing an even larger amount of electrical discharge energy to be applied to the workpiece-to-electrode space, providing a fluid for electrical discharge machining which enables discharge efficiency to be greatly raised and discharge machining speed to be increased.

Improvement of the above machining characteristics can be achieved by employing an electrical discharge machining working fluid the base oil of which is a synthetic oil or a mineral oil having a 50% distillation temperature not greater than 200° C., and adding to this 1 to 30 (V%) of a high viscosity oil which has a end-point of 300° C. or more. As the additive high-viscosity oil may be used a blend of several types of oil, as long as the end-point thereof is 300° C. or more.

From the viewpoint of environmental cleanliness, a hydrocarbon mineral oil having a straight-chain molecular structure is preferably as the base oil, and from the viewpoint of safety the base oil used should also preferably have a flash point of 70° C. or more.

DESCRIPTION OF PREFERRED EMBODIMENTS

Figure 1:
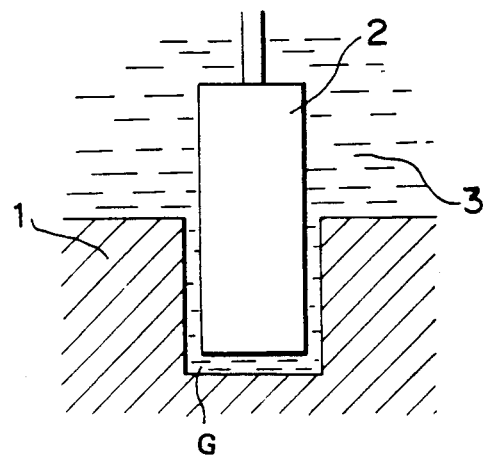
FIG. 1 is an enlarged cross-sectional view of the principal parts of a working embodiment of an electrical discharge machining apparatus according to the present invention.

In the machining state illustrated by FIG. 1, a pulsing current is applied across a gap between a workpiece 1 and an electrode 2 via electrical discharge machining fluid 3, the energy of the electrical discharge serving to cut the workpiece.

The electrical discharge machining fluid 3 was obtained by using as the base oil a low-viscosity mineral oil having a 50% distillation temperature of 180° C. and a flash point of 76° C., mixing in 15 V % of a high-viscosity oil having a end-point of 300° C. or more, and stirring thoroughly. By thus mixing two oils of differing viscosities and thoroughly stirring the mixture, the two oils are thoroughly blended. In this electrical discharge machining fluid 3 the fluidity of the low-viscosity mineral oil contained therein in a large quantity serves to expel chips and gas from the gap between electrode and workpiece, while at the same time the small quantity of high-viscosity oil serves to increase the discharge voltage. It therefore follows that use of this electrical discharge machining fluid 3 allows a greater amount of discharge energy to be applied to the electrode-to-workpiece gap while maintaining the chip removal performance, thereby enabling the erosion rate to be markedly increased.

Figure 2:
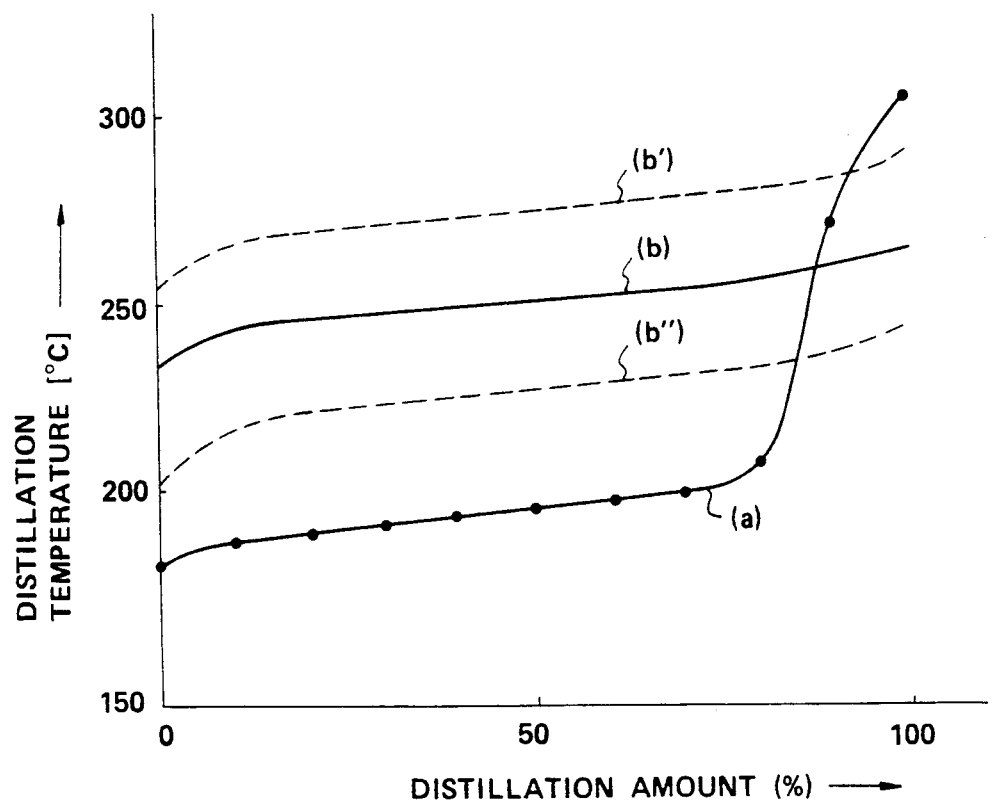
FIG. 2 is a graphic representation of distillation temperature characteristics.

In FIG. 2, the distillation temperature characteristics curve is indicated by (a). As can be seen from this figure, the distillation temperature is relatively low until the distillation amount is around 70%, but after this amount goes over 70–80% and the distillation temperature shows a steep rise, distillation temperature characteristics unique to the electrical discharge machining fluid according to this invention. Moreover, the distillation temperature characteristic curve of electrical discharge machining fluids now in general use, such as kerosene, is as shown by line (b) in FIG. 2, said distillation temperature characteristics being held more or less in the area having an upper limit (b') and a lower (b'').

As can be understood from the above explanation, in order to increase chip removal performance, it is preferable to use an even lower-viscosity base oil, and to increase the energy imparted to the electrode-to-workpiece gap, an even higher-viscosity oil is preferred. Experiments confirmed that use of a base oil having a 50% distillation temperature of not more than 200° C. and a high-viscosity oil having a end point of 300° C. or more resulted in a particularly good improvement in machining performance.

Figure 3:
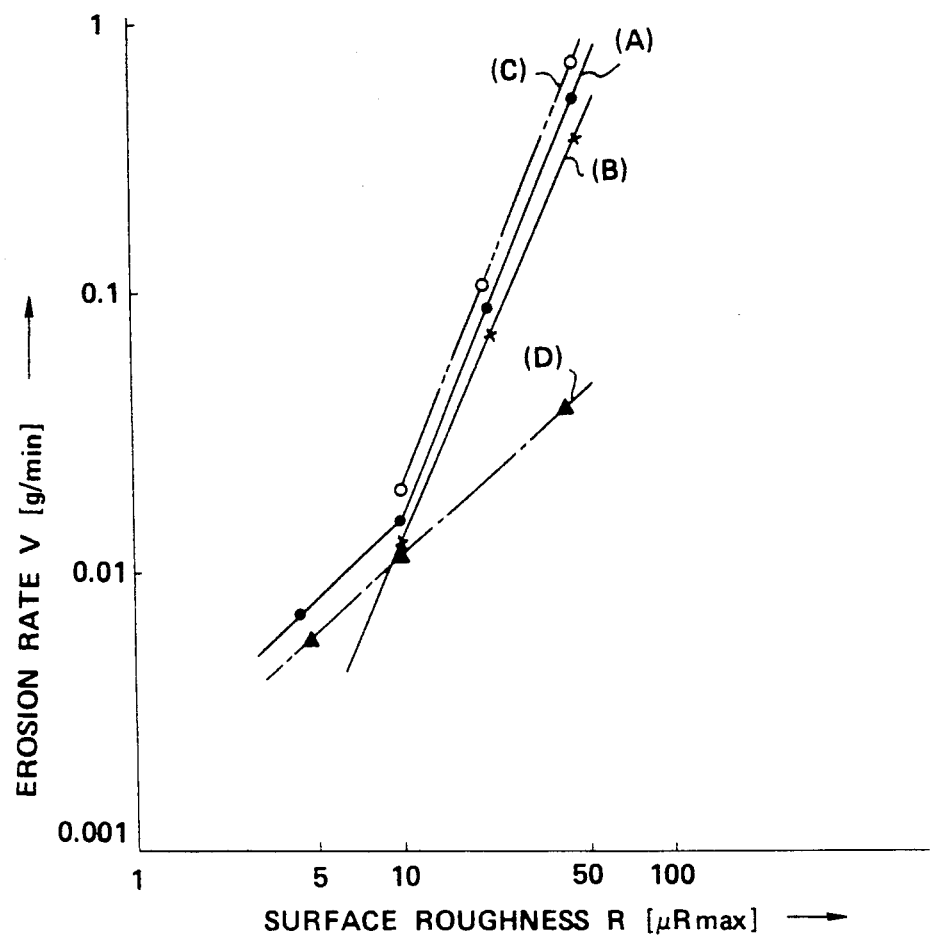
FIG. 3 is a graphic representation of the relationship between surface roughness and erosion rate.

In FIG. 3, characteristic curve (A) indicates the relationship between surface roughness R and erosion rate V when electrical discharge machining is performed using the above-described fluid. Curve (B) in FIG. 3 shows the characteristics in the case of the electrical discharge machining fluid having the distillation temperature characteristics illustrated by the (b) in FIG. 2. Comparison of the two curves shows that the erosion rate is improved at all surface roughnesses, with the improvement in erosion rate being especially notable for finishes of 10 ($\mu$Rmax.) or less, from which it can be understood that it is suitable for a wide range of machining, from rough machining to finish machining.

Still with reference to FIG. 3, (C) and (D) show the characteristics for high-viscosity mix ratios of 30 (V %) and 1 (V %), respectively. In the case of the 30 (V %) ratio of high-viscosity oil, while the erosion rate shows a further improvement, it is not suitable for machining to a surface roughness not exceeding 10 ($\mu$Rmax.). On the other hand, when the ratio of high-viscosity oil is 1 (V %), it was ascertained that it was possible to machine at a faster speed than has been the case with conventional electrical discharge machining fluids.

This therefore means that while the amount of high-viscosity oil to be added is not critical but may be suitably decided in accordance with the electrical discharge machining conditions for the objective at hand, in broad terms it will be from about 1 to 30 (V %), relative to the base oil.

Although as the base oil it is possible to use a hydrocarbon-based mineral oil or synthetic oil having a 50% distillation temperature of 200° C. or below, if a hydrocarbon-based oil is used which has a straight-chain molecular structure, there is no production of polycyclic aromatic hydrocarbons (PCA) or other carcinogenic substances, and as such, it is preferable to use a straight-chain molecular construction hydrocarbon-based oil.

As the above-described electrical discharge machining fluid does not contain surfactant, tar adhering to the chip surface does not separate therefrom and disperse in the fluid, so that there is no darkening of the fluid as the machining progresses, the portion being machined can be observed and there is no loss of operating efficiency. In addition, as high-viscosity oil is added to the electrical discharge machining fluid of this invention, even if the fluid should stick to the skin during the work, the skin is protected, preventing roughening of the hands, etc.

Furthermore, as the electrical discharge machining fluid of this invention has high chip-removal capabilities, it can provide a remarkable improvement in cavity machining and rib machining tasks.

Figure 4:
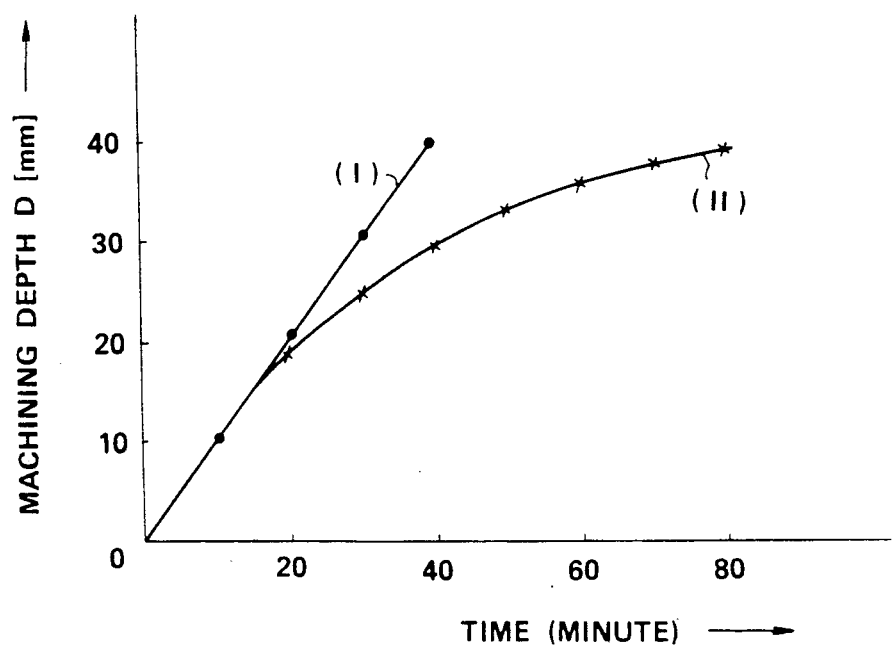
FIG. 4 is a graph showing characteristic curves of rib erosion rate.

The data shown in FIG. 4 were obtained on the basis of rib machining with an electrode 50 mm wide and 3 mm thick. Regarding FIG. 4, taking machining time t along the horizontal axis and machining depth D along the vertical axis, I shows the machining characteristics obtained using the machining fluid of this invention indicated by (a) in FIG. 2, and II shows the machining characteristics obtained using the conventional machining fluid indicated by (b) in FIG. 2. Machining conditions were: surface roughness of 60 $\mu$Rmax. and electrode wear not exceeding 0.1%. As can be seen from FIG. 4, use of the machining fluid according to this invention roughly halves the time taken to achieve a machining depth D of 40 mm. This is because, with the machining fluid of this invention, chips can be efficiently removed from the workpiece-to-electrode gap, so the discharge energy applied to the gap can be increased.

As is clear from the foregoing, the electrical discharge machining fluid provided by this invention enables good machining performance to be obtained without the machining fluid becoming darker with the progress of the machining, and is particularly suited to rib and cavity machining.

I claim:

1. Electrical discharge machining fluid comprising 1 to 30 percent by volume high-viscosity oil having a viscosity value of at least 10 (cSt) Kinematic viscosity at 200° F. added to low-viscosity mineral or synthetic base oil having a viscosity value about 0.8 (cSt) Kinematic viscosity at 200° F., wherein the mixture has a viscosity value about 1.0 to 2.0 Kinematic viscosity at 140° F.

2. The electrical discharge machining fluid according to claim 1 wherein 50% distillation temperature of said base oil is not above 200° C. and end point of said high-viscosity oil is at least 300° C.

3. The electrical discharge machining fluid according to claim 1 wherein said base oil has a flash point of at least 70° C.

4. The electrical discharge machining fluid according to claim 2 wherein said base oil has a flash point of at least 70° C.

5. The electrical discharge machining fluid according to claim 1 wherein said base oil is a hydrocarbon-based mineral oil having a straight-chain molecular structure.

6. The electrical discharge machining fluid according to claim 1 wherein said high-viscosity oil is a blend of a plurality of oils.

7. Machining fluid used for electrical discharge machining comprising 1 to 30 percent by volume high-viscosity oil with an end point of at least 300° C. added to low-viscosity mineral or synthetic base oil in which a 50% distillation temperature is not above 200 degrees C. and a flash point is at least 70 degrees C.

8. The machining fluid according to claim 7 wherein said base oil is a hydrocarbon-based mineral oil having a straight-chain molecular structure.

9. The machining fluid according to claim 7 wherein said high-viscosity oil is a blend of a plurality of oils.

* * * * *